United States Patent [19]

Hirsch et al.

[11] Patent Number: 5,162,107
[45] Date of Patent: Nov. 10, 1992

[54] METHOD OF REPROCESSING ZINC- AND LEAD-CONTAINING RESIDUES FROM METALLURGICAL PLANTS BY MEANS OF A CIRCULATING FLUIDIZED BED SYSTEM

[75] Inventors: Martin Hirsch, Friedrichsdorf; Albert Kaune, Königstein; Alpaydin Saatci, Frankfurt; Karlheinz Broj, Hattersheim; Uwe Härter, Dinslaken; Walter Meichsner, Krefeld, all of Fed. Rep. of Germany

[73] Assignee: Metallgesellschaft Aktiengesellschaft, Frankfurt am Main, Fed. Rep. of Germany

[21] Appl. No.: 630,484

[22] Filed: Dec. 20, 1990

[30] Foreign Application Priority Data

Dec. 21, 1989 [DE] Fed. Rep. of Germany ....... 3942337

[51] Int. Cl.$^5$ .................................................. C01G 9/02
[52] U.S. Cl. .................................. 423/623; 423/622; 423/104; 423/107; 423/108; 423/97; 423/619; 423/DIG. 16
[58] Field of Search ............... 423/107, 108, 97, 99, 423/148, 622, 89, 623, 619, DIG. 16, 104

[56] References Cited

U.S. PATENT DOCUMENTS

| | | | |
|---|---|---|---|
| 1,924,872 | 8/1933 | Mason | 423/108 |
| 1,936,092 | 11/1933 | Kuzell | 423/107 |
| 1,941,569 | 1/1934 | McCraven | 423/107 |
| 2,023,980 | 9/1935 | Bunce | 423/107 |
| 2,139,196 | 12/1938 | Maidens | 423/107 |
| 2,140,309 | 12/1938 | Betterton et al. | 423/108 |
| 2,150,072 | 3/1939 | Maidens | 423/107 |
| 2,269,355 | 1/1942 | Beringer | 423/108 |
| 2,855,288 | 11/1958 | Cyr et al. | 423/108 |
| 3,649,186 | 3/1972 | Colombo et al. | 423/108 |
| 3,756,804 | 9/1973 | Stevenson | 75/483 |
| 3,850,613 | 11/1974 | Allen | 75/752 |
| 4,396,424 | 8/1983 | Yatsunami et al. | 423/97 |
| 4,488,905 | 12/1984 | Santen | 75/10.19 |
| 4,595,574 | 6/1986 | Matsuoka et al. | 423/107 |

FOREIGN PATENT DOCUMENTS

| | | |
|---|---|---|
| 0150805 | 8/1985 | European Pat. Off. . |
| 4632334 | 10/1968 | Japan .................... 423/108 |
| 2122648 | 1/1984 | United Kingdom ........ 423/108 |

OTHER PUBLICATIONS

*In Re Edwards* 109 USPQ 380 (CCPA 1956).
Proceedings Ist. Proc. Technol. Conference, Washington (1980), pp. 85 to 103.

*Primary Examiner*—Theodore Morris
*Assistant Examiner*—Edward Squillante
*Attorney, Agent, or Firm*—Felfe & Lynch

[57] ABSTRACT

A zinc- and lead-containing residue from a metallurgical plant is reprocessed by a thermal treatment in a circulating fluidized bed system. A major part of the heat demand is satisfied by a combustion of solid carbonaceous material in the fluidized bed reactor of the circulating fluidized bed system. A reducing fluidizing gas, which is virtually free of free oxygen, is fed to the lower part of the fluidized bed reactor. A solid carbon content of from 5 to 30% is adjusted in the fluidized bed in the lower portion of the fluidized bed reactor, which is supplied in its upper portion with oxygen-containing gases and in which $CO_2$ is formed only at such a rate that zinc metal is not reoxidized. Substantially all solids are removed in a recycling cyclone from the suspension discharged from the reactor and the removed solids are recycled. The gas is cooled to a temperature at which zinc metal is oxidized to ZnO. The dust-like zinc compounds and lead compounds are removed from the gas.

14 Claims, 1 Drawing Sheet

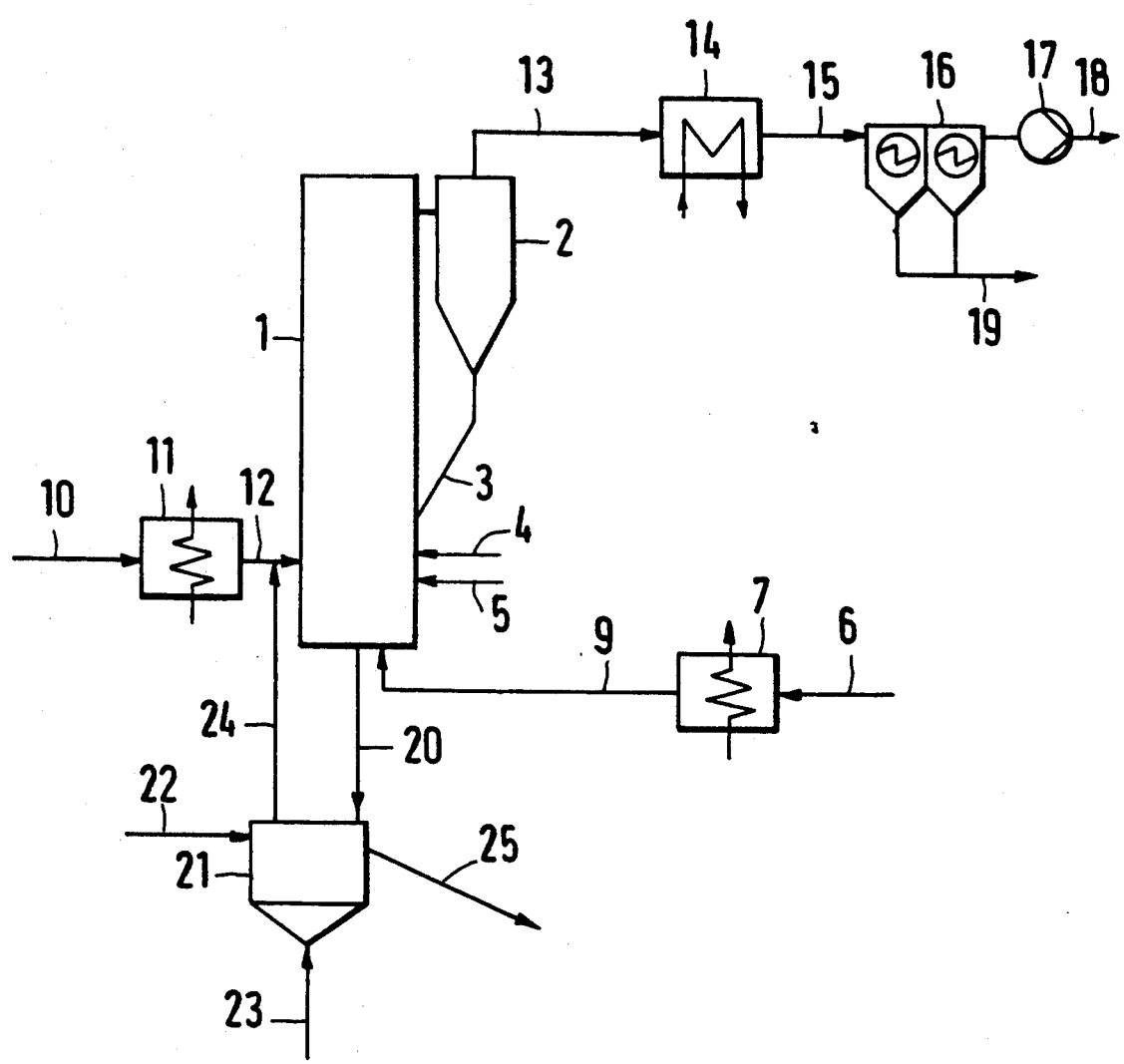

METHOD OF REPROCESSING ZINC- AND LEAD-CONTAINING RESIDUES FROM METALLURGICAL PLANTS BY MEANS OF A CIRCULATING FLUIDIZED BED SYSTEM

BACKGROUND OF INVENTION

The present invention is in a method for reprocessing zinc-and lead-containing residues from metallurgical plants by a thermal treatment at elevated temperatures and under reducing conditions whereby zinc and lead are volatilized, higher iron oxides are reduced as fully as possible to FeO and zinc and lead vapor are removed from the exhaust gas after it has been cooled.

In the manufacture of pig iron and steel, residues consisting of dusts and sludges are formed in various processing operations, e.g., in the sintering plants, at the blast furnace and in rolling mills. The formed residues consist mainly of iron but contain small amounts of zinc, lead and alkalies and/or are contaminated with oil. The residues cannot readily be recycled to the process operation, e.g., via the sintering plant, because the presence of zinc, lead and alkalies give rise to difficulties in the blast furnace process. Ecological concerns make dumping of such residues increasingly difficult and undesirable. Additionally, considerable amounts of iron, zinc and lead would be lost in a dump. For this reason the contents of zinc, lead, alkalies and oil in such a residue must be decreased before it can be recycled to a sintering plant.

In known processes, zinc, lead and alkalies are volatilized under reducing conditions and a considerable part of the iron oxides is reduced to metallic iron. The sintering of a so-pretreated residue results in the reoxidation of the residue iron metal content. Additionally, the sintering process may be adversely affected by the iron metal contained in the mixture to be sintered.

In other known processes the iron content is reduced only to FeO.

German Patent Publication 10 56 157 discloses a process for treating zinc-containing iron ores in a fluidized bed to form an exhaust gas containing zinc partly as zinc metal and partly as zinc oxide. The iron oxides are at least in part reduced to FeO. However, for a more rapid removal of zinc, the iron oxides must be reduced to iron metal. The zinc-containing iron ores are fed as pellets having a size of the order of millimeters. The fluidized dust is collected from the exhaust gas in a hot cyclone and is recycled to the fluidized bed. The purified exhaust gas is afterburnt with oxidation of zinc metal to ZnO, which is then collected in a dust collector. The reducing gas is introduced from below through a tubular gas feed port. A discontinuous operation has been described because the dezinced material can be discharged through the tubular gas feed port when the gas supply is discontinued.

French Patent Specification 2,373,612 and "Proceedings Ist. Proc. Technol. Conference", Washington (1980) at pages 85 to 103, describe volatization of zinc and lead without the formation of iron metal if coal is not used as a reducing agent. For this reason, dust formed in a metallurgical plant, e.g. of blast furnace dust, and which has a relatively high content of solid carbon is treated to remove the carbon prior to subjecting the dust to a reducing treatment. That carbon removal may be carried out by physical processes. Also the solid carbon content may be almost entirely combusted under oxidizing conditions in a preceding separate stage. The material is treated on a traveling grate or in a shaft furnace. A separate process stage is required for the removal of solid carbon and part of the heat generated by the combustion of solid carbon is lost for the process.

It is an object of the invention to provide a continuous method for the reprocessing of residues from metallurgical plants which permits a reducing treatment in the presence of solid carbonaceous material in conjunction with an effective volatilization.

SUMMARY OF THE INVENTION

The above stated object and others are accomplished by the practice of the invention. In the process of the invention, the thermal treatment of the residue is carried out in the reactor of a circulating fluidized bed system which can consist of a fluidized bed reactor, a cyclone and a recycle device. A reducing fluidizing gas, which is virtually free of free oxygen, is introduced into the lower portion of the fluidized bed reactor of the circulating fluidized bed system. The rate and composition of the fluidizing gas are controlled to maintain in the lower portion of the fluidized bed reactor such a reduction potential that at least 80% of the iron content are present as $Fe^{2+}$, not in excess of 1% of the iron content is present as iron metal and the balance is present as $Fe^{3+}$. The solid carbon content in the lower portion of the fluidized bed reactor is adjusted to a range of from 5 to 30%. Oxygen-containing gas is fed to the upper portion of the fluidized bed reactor.

A major part of the heat demand is satisfied by combustion of solid carbon but $CO_2$ is formed only at such a rate that a reoxidation of zinc metal in the reactor is avoided. The expression "a major part" means that more than 50% of the heat demand is satisfied from the combustion of solid carbon. A portion of the heat demand is satisfied by a combustion of reducing gas. Additionally a portion of the demand may be satisfied by combustion of iron metal if iron metal is contained in the feed.

The temperature required for the reoxidation of zinc metal will depend on the CO content in the gas mixture containing the CO and $CO_2$. The ratio of $CO:CO_2$ in the upper portion of the reactor is about (0.3 to 1):1. At temperatures in the range of 900°-1100° C. in the upper reactor, there will be no substantial reoxidation of zinc.

A gas-solids suspension is discharged from the upper portion of the fluidized bed reactor and is fed to the recycling cyclone of the circulating fluidized bed system. Substantially all of the solids are removed from the suspension in the cyclone. The collected solids are recycled to the fluidized bed reactor in an amount so that the amount of solids which is circulated per hour in the circulating fluidized bed system is at least 5 times the weight of the solids contained in the fluidized bed reactor. The cleaned gas leaving the recycling cyclone is cooled to a temperature at which zinc metal is oxidized to ZnO and the dust-like zinc compounds and lead compounds are removed from the gas. The gas leaving the recycling cyclone can be cooled by a spraying of water into the gas and/or by an indirect heat exchange.

The residues from metallurgical plants may particularly consist of dust formed from numerous iron and steel-making operations such as from blast furnace top gas, steel-making converters, and electric furnaces. The residues may have a particle size up to about 3 mm. When residues formed in the electrolytic production of zinc are used, the sulfate content of any jarosite residue must be decomposed before the residue is treated.

In the practice of the invention, the lower zone of the fluidized bed reactor is operated under more strongly reducing conditions than is the reactor upper zone. The lower zone extends up to about 30% of the height of the fluidized bed reactor. The reducing fluidizing gas may particularly consist of coke oven gas or converter gas formed in the steel-making process. The solid carbon content in the lower zone of the fluidized bed in the reactor is adjusted to about 5 to 30%. More than 80% of any iron metal which has entered the upper zone with the feed is oxidized to $Fe^{2+}$ and the remainder to $Fe^{3+}$ except for not in excess of 1% iron metal so that the iron metal in the feed is used as a fuel. The oxygen-containing gas which is employed may consist of air, oxygen-enriched air and commercially pure oxygen. A temperature of from 900° to 1100° C. is adjusted in the fluidized bed reactor. The average solids content is 300 to 600 kg/m³ in the reactor lower zone and 5 to 50 kg/m³ in the upper zone.

The discharge of the solid material is continuously effected from the lower part of the fluidized bed reactor or from the recycle line.

The residues from metallurgical plants are preferably fed to the upper zone of the reactor. If the solid carbon content of the residues from metallurgical plants is insufficient, solid carbonaceous material, consisting particularly of coke or anthracite, can be added.

In addition to zinc and lead, alkalies and, e.g., chlorine may be volatilized. Any oil contained in the feed will be vaporized and will act as a fuel.

The circulating fluidized bed system can consist of the fluidized bed reactor, a cyclone and a recycling line through which the solids collected in the cyclone can be recycled to the reactor. The cyclone may be a single cyclone or a plurality of cyclones which have gas paths connected in parallel. As distinguished from an "orthodox" fluidized bed, in which a dense phase is separated by a distinct density step from an overlying gas space, the fluidized bed process used for the invention provides in the fluidized bed reactor for states of distribution without a defined boundary layer. There is no density step between a dense phase and an overlying gas space but the solids concentration in the reactor decreases gradually from bottom to top. By means of the Froude and Archimedes numbers the operating conditions can be defined by the following ranges:

$$0.1 \leq 3/4 \times Fr^2 \times \frac{\rho_g}{\rho_k - \rho_g} \leq 10$$

or $$0.01 \leq Ar \leq 100$$

wherein $$Ar = \frac{d_k^3 \times g(\rho_k - \rho_g)}{\rho_g \times \nu^2}$$

and $$Fr^2 = \frac{u^2}{g \times d_k}$$

and u = relative velocity of gas in m/s,
Ar = Archimedes number,
Fr = Froude number,
$\rho_g$ = density of gas in kg/m³,
$\rho_k$ = density of solid particle in kg/m³,
$d_k$ = diameter of the spherical particle in m,
$\nu$ = kinematic viscosity in m²/s,
g = constant of gravitation in m/s².

In accordance with a preferred embodiment of the invention, solid carbonaceous material is fed to the lower portion of the fluidized bed reactor below the inlet for the oxygen-containing gases. This will improve the utilization of the carbon in the fluidized bed reactor.

In accordance with another preferred embodiment, the hot solids which have been discharged from the circulating fluidized bed system are subjected to a direct heat exchange with oil-containing moist solids and the resulting vaporization products are fed to the fluidized bed reactor. The oil-containing moist solids which are employed contain virtually no zinc and no lead and consist, e.g., of roll scale. The vaporization products consist of oil, cracked products and water vapor and are preferably fed approximately on the level of the inlet for the oxygen-containing gases. As a result the heat content of the solids discharged from the fluidized bed reactor can be utilized for a disposal of such material and the combustible products thus obtained can be utilized in the fluidized bed reactor.

In accordance with a further preferred embodiment, the direct heat exchange is effected in an orthodox fluidized bed, in which a fluidization is preferably effected by means of air, which together with the vaporization products is fed as an oxygen-containing gas to the fluidized bed reactor.

In still another preferred embodiment, the direct heat exchange is effected in a mechanical mixer, which may particularly consist of a screw mixer.

In accordance with yet another preferred embodiment, the exhaust gas from the recycling cyclone has a $CO:CO_2$ ratio in the range of from (0.3 to 1):1. That ratio will result in particularly good operating conditions.

In accordance with another preferred embodiment, the fluidizing gas and/or the oxygen-containing gas is preheated by indirect heat exchange before entering the fluidized bed reactor. The heating fluid may consist of the exhaust gas from the recycling cyclone before the collection of secondary dust or of the afterburnt exhaust gas after the collection of secondary dust. Extraneous heat, e.g., hot gases produced by a combustion of coke oven gas or of gas produced by a steel-making process, may also be used. As a result, the thermal economy of the process is improved.

In accordance with another preferred embodiment, the feed is preheated by direct heat exchange with the gas from the recycling cyclone. Preheating can be effected in a suspension-type heat exchanger. This will still further improve the heat economy of the process.

In accordance with a further preferred embodiment, the ultrafine residue from metallurgical plants is subjected to a microagglomerating treatment to form agglomerates having a particle size not in excess of 3 mm. The agglomerates are subsequently fed to the circulating fluidized bed system. The microagglomerating treatment may result, e.g., in the production of micropellets. This will result in a more uniform composition of the fluidized bed in the fluidized bed reactor and will facilitate the separation of solids and metal vapor-containing gases.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The FIGURE schematically depicts a system for the practice of the invention.

DESCRIPTION OF PREFERRED EMBODIMENT

Referring to the drawing, a circulating fluidized bed system comprises a fluidized bed reactor 1, a recycling cyclone 2 and a recycling line 3. A residue from a metallurgical plant is introduced into the fluidized bed reactor 1 through line 4. Coal is supplied to the reactor through line 5. A reducing gas is fed through line 6 to an indirect heat exchanger 7 wherein it is preheated and is subsequently fed through line 9 to the fluidized bed reactor 1. An oxygen-containing gas is fed through line 10 to the indirect heat exchanger 11 wherein that gas is preheated. The preheated gas from heat exchanger 11 is then fed through line 12 to the fluidized bed reactor 1 as secondary gas.

The lower zone of the fluidized bed in the fluidized bed reactor 1 is operated under more strongly reducing conditions and extends upwardly approximately to about the level of the inlet 12 for the oxygen-containing secondary gas.

Subsequently all solids in the gas-solids suspension discharged from the fluidized bed reactor 1 are removed in the recycling cyclone 2 and the collected solids are recycled in the recycling line 3 to the fluidized bed reactor 1. The gas from the recycling cyclone 2 is fed through a line 13 to an indirect heat exchanger 14 and is cooled therein to a temperature at which zinc metal is oxidized to ZnO. The gas is subsequently fed through line 15 to dust collector 16 wherein the dust is removed from the gas. The dust-free gas is discharged by a fan 17 through a line 18.

The secondary dust which has been collected in the dust collector 16 is withdrawn in line 19. Solids are continuously withdrawn from the lower portion of the fluidized bed reactor through line 20 and fed to the orthodox fluidized bed cooler 21. Cooler 21 is supplied with oil-containing moist solids through line 22 and with an oxygen-containing fluidizing gas through line 24. The fluidizing gas heated in cooler 21 containing the resulting vaporization products is fed as secondary gas in line 24 to line 12 and further to the fluidized bed reactor 1. Solids are withdrawn from the fluidized bed cooler 21 through line 25.

Example

A circulating fluidized bed reactor was employed in the practice of the invention. The fluidized bed reactor had a height of 15 m and a diameter of 2.6 m. The inlet for the oxygen-containing gases was about 4 m above the reactor bottom, and the inlets for coal and the inlet for the residue from a metallurgical plant were respectively 3.5 m and 4.5 m above the bottom end. The recycling line for the solids collected in the recycling cyclone opened into the fluidized bed reactor at a level which was 5 m above the bottom end of the reactor. The treated solids were withdrawn from the lower zone of the fluidized bed reactor. The residues from a metallurgical plant consisted of a mixture of blast furnace top gas sludge, dust from metallurgical converters and dust collected in a dedusting electrostatic precipitator which succeeded a sintering plant. That mixture had the following composition on a dry basis:

| | |
|---|---|
| Fe (total) | 57.5% |
| $Fe^{2+}$ | 4.1% |
| Fe metal | 10.1% |
| Mn | 0.8% |
| P | 0.04% |
| $SiO_2$ | 2.4% |
| CaO | 4.6% |
| MgO | 0.7% |
| S | 0.24% |
| Pb | 0.6% |
| Zn | 1.6% |
| $K_2O + Na_2O$ | 1.8% |
| C | 4.6% |
| $Cl^-$ | 0.6% |
| ignition loss | 4% |

The moisture content amounted to 12%.

The fluidized bed reactor was supplied with 20,000 kg/h of the above mixture and with 3,200 kg/h of coke having a particle size below 1 mm. A fluidizing gas consisting of coke oven gas at a rate of 4,000 $Nm^3/h$ was fed to the fluidized bed reactor. The coke gas contained

| | |
|---|---|
| 60.2% | $H_2$ |
| 25.5% | $CH_4$ |
| 6% | CO |
| 1.5% | $CO_2$ |
| 3.4% | $N_2$ |
| 3.1% | heavy hydrocarbons. |

The coke oven gas was preheated in an indirected heat exchanger and was fed at a temperature of 600° C. to the fluidized bed reactor. The reactor was supplied at a rate of 11,000 $Nm^3/h$ with an oxygen-containing gas consisting of air that had been preheated to 750° C. by an indirect heat exchange. The temperature in the fluidized bed reactor was adjusted to 1000° C. The gas leaving the recycling cyclone had the following composition:

| | |
|---|---|
| 3% | CO |
| 6% | $CO_2$ |
| 11% | $H_2$ |
| 35% | $H_2O$ |
| 45% | $N_2$ |

The gas was cooled to 250° C. in an indirect heat exchanger and was then passed through a filter, in which secondary dust was collected at a rate of 1,000° kg/h.

The secondary dust contained

| | |
|---|---|
| 26% | Zn |
| 10% | Pb |
| 40% | C |

Solids, at a temperature of 1000° C., were withdrawn at a rate of 19,200 kg/h from the lower zone of the fluidized bed reactor and were fed to a fluidized bed cooler containing an orthodox fluidized bed. The fluidized bed cooler was fed at a rate of 4,000 kg/h with roll scale sludge that contained water at a rate of 800 kg/h and contained 68% total Fe and 4% organic components Air at a rate of 1000 Nm³/h was fed through the bottom of the fluidized bed cooler and was withdrawn from the fluidized bed cooler at its top and, as an oxygen-containing gas, was fed to the fluidized bed reactor of the circulating fluidized bed system. Cooled solids at a rate of 23,000 kg/h were withdrawn from the fluidized bed cooler. The solids contained:

| total Fe | 58% |
|---|---|
| Fe metal | 0.5% |
| C | 15% |
| S | 0.2% |
| Zn + Pb | 0.1% |

The advantages afforded by the invention reside in that a major part of the heat required for the process is generated by a direct combustion of solid carbon in the fluidized bed itself and a substantial dezincing is nevertheless effected so that a highly economical reprocessing of the residue can be effected.

It will be understood that the specification and examples are illustrative but not limitative of the present invention and that other embodiments within the spirit and scope of the invention will suggest themselves to those skilled in the art.

What is claimed is:

1. A method of reprocessing a zinc and lead containing residue from a metallurgical plant comprising:

introducing the residue into a fluidized bed reactor means of a circulating fluidized bed system comprising the reactor means, cyclone means and recycle means;

thermally treating the residue at an elevated temperature and under reducing conditions in said reactor means;

volatilizing zinc and lead;

reducing higher iron oxides as fully as possible to FeO;

introducing a reducing fluidized gas virtually free of free oxygen into a lower portion of the fluidized bed reactor means;

controlling the rate and composition of the fluidized gas to maintain in the lower portion of the reactor such a reduction potential that at least 80% of the iron content is present as $Fe^{2+}$, not in excess of 1% iron content is present as metal iron and the balance being present as $Fe^{3+}$;

introducing a solid carbonaceous material into said reactor means and adjusting the solid carbon content in the lower portion thereof to about 5 to 30%;

supplying an oxygen-containing gas to an upper portion of the reactor means;

supplying a portion of the heat demand for the thermal treatment from the combustion of the carbonaceous material and forming $CO_2$ at a rate insufficient to reoxidize zinc metal;

forming a gas-solids suspension in the reactor means and discharging the suspension at an upper portion thereof;

removing solids from said suspension in the cyclone means and recycling the removed solids to the reactor means at a rate per hour equivalent to at least 5 times the weight of the solids contained in the reactor means;

exhausting a cleaned gas from the cyclone means and cooling the gas to a temperature at which zinc metal is oxidized to ZnO; and removing a dust-like zinc compound and lead compound from the gas.

2. The method of claim 1 wherein the carbonaceous material is solid carbon and is fed to the lower portion of the fluidized bed reactor below inlet means for the oxygen-containing gas.

3. The method of claim 1 wherein hot solids are discharged from the circulating fluidized bed system and are subjected to a direct heat exchange with oil-containing moist solids.

4. The method of claim 3 wherein vaporization products formed by the direct heat exchange and said products are fed to the reactor means.

5. The method of claim 3 wherein the direct heat exchange is effected in an orthodox fluidized bed.

6. The method of claim 3 wherein the direct heat exchange is effected in a mechanical mixer.

7. The method of claim 1 wherein the gas from the recycling cyclone contains CO and $CO_2$ in a $CO:CO_2$ ratio of (0.3 to 1):1.

8. The method of claim 1 wherein the fluidizing gas and/or the oxygen-containing gas is preheated by an indirect heat exchange before it enters the fluidized bed reactor.

9. The method of claim 1 wherein the feed is preheated by a direct heat exchange with the gas from the recycling cyclone.

10. The method of claim 1 wherein an ultrafine residue is subjected to a microagglomerating treatment to form agglomerates.

11. The method of claim 10 wherein the agglomerates have a particle size not in excess of 3 mm.

12. The method of claim 11 wherein the agglomerates are fed to the circulating fluidized bed system.

13. The method of claim 1 wherein a major portion of the heat demand is supplied by the combustion of the carbonaceous material.

14. The method of claim 1 wherein the temperature in the upper part of the reactor means is maintained at 900° to 1100° C. and the $CO:CO_2$ ratio in the upper part of the reactor means is (0.3 to 1):1.

* * * * *